United States Patent
Smith

(10) Patent No.: US 11,806,682 B2
(45) Date of Patent: Nov. 7, 2023

(54) OPTIMIZING DRILLING MUD SHEARING

(71) Applicant: Highland Fluid Technology, Inc., Houston, TX (US)

(72) Inventor: Kevin W. Smith, Bellaire, TX (US)

(73) Assignee: SCIDEV ENERGY SERVICES, INC., Houston, TX (US)

(*) Notice: Subject to any disclaimer, the term of this patent is extended or adjusted under 35 U.S.C. 154(b) by 0 days.

(21) Appl. No.: 18/092,638

(22) Filed: Jan. 3, 2023

(65) Prior Publication Data

US 2023/0149869 A1    May 18, 2023

Related U.S. Application Data

(62) Division of application No. 16/825,342, filed on Mar. 20, 2020, which is a division of application No.
(Continued)

(51) Int. Cl.
*E21B 21/06*   (2006.01)
*B01F 35/212*   (2022.01)
(Continued)

(52) U.S. Cl.
CPC .............. *B01F 31/81* (2022.01); *B01F 23/53* (2022.01); *B01F 25/51* (2022.01);
(Continued)

(58) Field of Classification Search
CPC ..... E21B 21/062; B01F 35/212; B01F 35/222
(Continued)

(56) References Cited

U.S. PATENT DOCUMENTS 3,214,149 A * 10/1965 Budzien ................ F04D 5/007
366/264
4,370,885 A * 2/1983 Alekhin ................ E21B 21/062
73/152.49

(Continued)

*Primary Examiner* — David L Sorkin
(74) *Attorney, Agent, or Firm* — PIERSON INTELLECTUAL PROPERTY LLC

(57) ABSTRACT

Viscosity and other properties are determined at desired temperatures in drilling mud and other fluids by using a versatile cavitation device which, operating in the cavitation mode, mixes and heats the fluid to a specified temperature, and, operating in the shear mode, acts as a spindle for application of Couette principles to determine viscosity as a function of shear stress and shear rate. The invention obviates the practice of adjusting rheology of a drilling fluid by passing it through the drill bit. Drilling fluid may be managed by a "straight-through" method to the well, or by placing the cavitation device in a loop which isolates an aliquot of known volume and circulating the fluid through the loop including the cavitation device. A controller may be programmed to manage the viscosity and other properties at various temperatures by controlling the power input and angular rotation of the "spindle" (which has cavities on its cylindrical surface), and feeding viscosity-adjusting agents and other additives to the fluid. Data may be collected from the loop and used in the "straight-through" mode until it is determined that conditions require a new set of data, or the loop may be used continuously. The system may be used with a supplemental viscometer, density meter, and other instruments.

7 Claims, 4 Drawing Sheets

Related U.S. Application Data

15/467,315, filed on Mar. 23, 2017, now Pat. No. 10,695,729.

(60) Provisional application No. 62/312,807, filed on Mar. 24, 2016.

(51) Int. Cl.
| | |
|---|---|
| *B01F 35/222* | (2022.01) |
| *B01F 31/81* | (2022.01) |
| *E21B 41/00* | (2006.01) |
| *B01F 23/53* | (2022.01) |
| *B01F 25/51* | (2022.01) |
| *B01F 27/272* | (2022.01) |
| *B01F 35/94* | (2022.01) |
| *B01F 35/21* | (2022.01) |
| *B01F 35/221* | (2022.01) |
| *E21B 21/08* | (2006.01) |
| *G01N 11/00* | (2006.01) |
| *B01F 35/90* | (2022.01) |
| *B01F 101/49* | (2022.01) |
| *E21B 49/00* | (2006.01) |

(52) U.S. Cl.
CPC ........ *B01F 27/2722* (2022.01); *B01F 35/212* (2022.01); *B01F 35/2136* (2022.01); *B01F 35/222* (2022.01); *B01F 35/221422* (2022.01); *B01F 35/94* (2022.01); *E21B 21/062* (2013.01); *E21B 21/08* (2013.01); *E21B 41/00* (2013.01); *G01N 11/00* (2013.01); *B01F 2035/99* (2022.01); *B01F 2101/49* (2022.01); *E21B 49/003* (2013.01)

(58) Field of Classification Search
USPC .......................................... 366/136, 137, 264
See application file for complete search history.

(56) References Cited

U.S. PATENT DOCUMENTS

| | | | | |
|---|---|---|---|---|
| 5,042,296 | A * | 8/1991 | Burgess | E21B 21/08 |
| | | | | 73/152.19 |
| 5,188,090 | A * | 2/1993 | Griggs | F24V 40/00 |
| | | | | 122/26 |
| 5,385,298 | A * | 1/1995 | Griggs | F24V 40/00 |
| | | | | 122/26 |
| 5,957,122 | A * | 9/1999 | Griggs | B01F 27/2722 |
| | | | | 122/26 |
| 6,079,508 | A * | 6/2000 | Caza | B09C 1/02 |
| | | | | 175/207 |
| 7,546,874 | B2 * | 6/2009 | Smith | E21B 21/063 |
| | | | | 166/267 |
| 7,614,367 | B1 * | 11/2009 | Frick | F22B 1/16 |
| | | | | 122/411 |
| 7,736,521 | B2 * | 6/2010 | Sloan | E21B 43/088 |
| | | | | 210/742 |
| 2016/0047184 | A1 * | 2/2016 | Luharuka | B01F 35/2136 |
| | | | | 166/250.01 |

* cited by examiner

OPTIMIZING DRILLING MUD SHEARING

This application is a divisional application of U.S. divisional application Ser. No. 16/825,342 filed Mar. 20, 2020 which claims priority to U.S. application Ser. No. 15/467,315 filed Mar. 23, 2017, issued as U.S. Pat. No. 10,695,729 on Jun. 30, 2020, which claims priority from U.S. Provisional application No. 62/312,807 filed Mar. 24, 2016.

FIELD OF THE INVENTION

This invention relates to the preparation and maintenance of drilling mud properties, especially rheology, viscosity, shear, density, solids, and water/oil ratio, either at a mud plant where drilling fluids are mixed and stored for delivery or during the ongoing drilling process in the recovery of hydrocarbons from the earth. The invention utilizes a cavitation mixer placed in a loop capable of isolating an aliquot of drilling mud from either the conduit leading to the well or a tank used to make up new mud or to store mud. The cavitation mixer imitates the shear and heating generated when pumping the drilling mud through the drilling bit at various temperatures. The rheology and other properties of the drilling mud are maintained at desired values by regulating, in the loop, the addition of viscosity-adjusting agents, other additives, the flow rate, and the speed of the mixer to obtain a desired shearing effect in the mixer in real time without the need for lab tests. The cavitation mixer not only heats and shear mixes, but is able to function as a viscometer, reinforcing optional separate viscometer readings. Other properties can be monitored and regulated in the loop.

BACKGROUND OF THE INVENTION

Drilling muds are complex, typically non-Newtonian fluids that serve multiple, critical functions in drilling wells for oil and gas extraction. The fluid is used to remove formation drill cuttings from the wellbore, and the fluid adds hydrostatic mass to help prevent uncontrolled flow of hydrocarbons from the well. The fluid also enables buoyancy to counteract the weight of the drill pipe so that one can drill deeper wells. The fluid also lubricates the bit and stabilizes the wellbore as drilling continues deeper. Limiting the loss of fluid to the recently drilled formation is another important function, and limiting fluid loss typically means the use of bridging agents that are sized particles. It is essential to know the properties of the fluids so they can perform their many functions efficiently.

Some fluid properties are relatively easy to determine in line as the fluid is being used. For example, a Coriolis Meter can accurately determine the flow rate and density of the fluid, but determining rheology of a complex drilling fluid is more complicated; it is commonly done by a manual mud check according to API 13B. Accurate knowledge of a fluid's rheology is required to calculate a Yield Point and plastic viscosity. If the mud is too thick, the mud pump cannot pump it. If the fluid is too thin, it may not suspend the solids that have to be removed from the wellbore as one continues drilling deeper. To continue drilling deeper, drill pipe has to be added to the string. During additions to the string, the mud is no longer being pumped, and Yield Point, which is part of the rheology, determines the pressure needed to move the fluid again after it has been static in the wellbore. If Yield Point (YP) is too high, the pump cannot begin to move the flow of mud.

Prior to the present invention, it has been common not to attempt to shear mix a drilling mud before it is sent down the well to the drill bit, but rather to utilize the drill bit itself to shear mix the drilling mud. This means the rheological properties of the drilling mud are not the most desirable when the mud arrives at the point of drilling, and often can be far from optimum. Moreover, the drilling process adds drill cuttings and other solids and fluids to the drilling fluid, which continuously change significantly the physical properties of the fluid. The prior method, relying on the drill bit for shear mixing, injects considerable uncertainty into the overall process.

One reason the art has relied on the drill bit for shear mixing is that there had not been available a practical way to shear mix the ponderous drilling mud components in a continuous recycling mode.

It takes time to run the "mud checks" specified by the American Petroleum Institute (API) 13B. Mud checks require a skilled operator to successfully run and to report the mud properties. Without shearing the mud, however, the chemistry is not fully activated and the desired rheology is not achieved. In the laboratory either a Hamilton Beach blender or a Silverson mixer is used to imitate the shear developed by a trip through the drilling bit. There is disagreement about which device to use and the amount of time required to mix the mud before running a mud check. Both the Hamilton Beach blender and the Silverson have commercial units that replicate their laboratory units, but they are not typically used for large batches at a drill site for a number of reasons. One problem is simply time. Typically in the laboratory it is common to make 350 ml portions to represent one barrel of fluid. If you shear a one barrel equivalent drilling fluid sample in the laboratory for 5 minutes, then to "scale up" the shear process at the wellsite, it takes the same 5 minutes per actual barrel. Unfortunately it takes too much time. If a rig has 1,000 bbls of drilling fluid, it would take 5,000 minutes or 3.5 days of processing to equal 5 minutes of shear used in the laboratory for the 1 bbl equivalent volume.

Volumes of drilling mud can range from 500 bbls to over 10,000 bbls on location that is stored in pits or tanks, and the mud can stratify based on the density of the additives. When relying on samples for API 13B, it is critical that they are representative of the drilling fluid to be used in the well, but all too often, imperfect sampling practice introduces errors into the API 13B procedure.

Rheology of drilling muds is measured using a Fann 35 or equivalent rotational viscometer that directly reads viscosity on a dial at different rpm. The dial reading is based on the deflection of a bob inside of a rotating cylinder, and the instrument must be calibrated regularly to be accurate. Temperature changes mud rheology, and to determine an accurate downhole rheology means the mud must be heated before measuring its viscosity. By definition, a mud check is done "offline" which takes valuable time and can delay critical decisions about well control. Rig time is often lost while the fluid is circulated in the hole to adjust drilling fluid for the proper rheology after a time delay and before continuing to drill.

A better way to conduct the shear mixing and the rheology measurement process is needed. Ideally a realtime, inline measurement of the mud properties is desired, but there are several challenges to its achievement. One challenge is simply the shear that happens at the bit needs to be replicated at the surface. There are high-pressure mixing devices that accomplish this shear, but they are expensive to build and operate; moreover, high-pressure is an HSE (health, safety and environmental) issue. The rheology measuring device is another challenge. Rheology measurement is used in numerous industries and there are a number of devices adapted for oil field use that include, but are not limited to, the Brookfield TT-100, Grace M3900, and Chandler 3300. The advantage of these types of devices is that they can be calibrated to replicate the Fann 35, and Fann 35 readings have become a de facto standard and it is not uncommon for mud engineers to quote viscosity at various Fann 35 speeds, or add chemistry based on a particular Fann 35 reading. A Fann 35 is a Couette style viscometer as are these three devices, and while they can be correlated to Fann 35 readings, they have intricate internal parts and small flow lines that can easily plug when fluid loss additives are in the drilling fluid. There are numerous other viscometers used in other industries that presumably would also work; however, a viscosity measurement is taken at a single shear rate or at shear rates that are harder to relate to a Fann 35 viscosity reading.

Rheology requires a shear rate vs shear stress curve to accurately calculate plastic viscosity and yield point. A pipe rheometer can be used to measure viscosity by accurately measuring the pressure drop across a known length of pipe of a known internal dimension while measuring an accurate flow rate. Pipe rheometers are commercially available from Chandler Engineering, Stim-Lab, Inc, or Khrone but they are relatively simple devices that can easily be built assuming an understanding of flow and viscosity calculations that are widely published. An example of the calculation required has been published by Petroleum Department of The New Mexico Institute of Mining and Technology as a class exercise available on the Internet as "L5 PipeViscometer.pdf".

An ideal device to measure flow in a pipe rheometer is a Coriolis meter which has a full opening pipe internal diameter such that it is not easily plugged. A Coriolis meter also gives an accurate mass flow, not just a volume flow rate. Coriolis meters such as the E+H Promass 831 can also measure viscosity. Given the critical performance required of drilling muds to ultimately prevent uncontrolled well events, using a combination of rheology measurement devices based on different principles would make sense. For example, a pipe rheometer requires accurate flow rate. Using the E+H Promass 831 for accurate flow rate could also validate the viscosity being reported by pressure drop. Whereas the pipe rheometer calculations are based on flow and pressure drop, the Promass 831 viscosity is a function of a vibration frequency.

Even with otherwise proper rheology measurement techniques, heat is an additional challenge. The fluid rheology should be measured at more than one temperature. Therefore the ideal device would shear the mud to replicate the shear imparted by the drill bit, heat the fluid to the proper temperature and report rheology at different predetermined temperatures.

Another challenge is where to take a sample. Drilling fluid often stratifies in a tank. A sample taken at the top of the tank, or at any single level, will not be representative of the composition in the entire tank.

SUMMARY OF THE INVENTION

Drilling mud is monitored and adjusted with immediate response to requirements by placing a cavitation mixer in a loop on the conduit leading from the source of mud ingredients to the well. The loop can isolate an aliquot of the mud to be used so that its rheology, viscosity, density and other properties can be determined at known flow rates and at temperatures present around the drill bit, and adjusted accordingly. Lab tests are not needed.

A cavitation mixer is a cavitation device used for mixing and heating fluids; in the present invention, it is also used to determine rheology of the drilling mud.

The phenomenon of cavitation, as it sometimes happens in pumps, is generally undesirable, as it can cause choking of the pump and sometimes considerable damage not only to the pump but also auxiliary equipment. However, cavitation, more narrowly defined because it is deliberately created, has been put to use as a source of energy that can be imparted to liquids. Certain devices employ cavities machined into a rotor turning within a cylindrical housing leaving a restricted space for fluid to pass. A motor or other source of turning power is required. The phenomenon of cavitation is caused by the passage of the fluid over the rapidly turning cavities, which creates a vacuum in them, tending to vaporize the liquid; the vacuum is immediately filled again by the fluid and very soon recreated by the centrifugal movement of the liquid, causing extreme turbulence in the cavities, further causing heat energy to be imparted into the liquid. Liquids can be simultaneously heated and mixed efficiently with such a device. Also, although the cavitation technique is locally violent, the process is low-impact compared to centrifugal pumps and pumps employing impellers, and therefore as a mixing technique is far less likely to cause damage to sensitive polymers used in oilfield fluids. Good mixing is especially important in mixing drilling muds.

Examples of cavitation devices are described in U.S. Pat. Nos. 5,385,298, 5,957,122, 6,627,784 and particularly U.S. Pat. No. 5,188,090, all of which are hereby specifically incorporated herein by reference in their entireties. These patents may be referred to below as the HDI patents.

The basic design of the cavitation devices described in the HDI patents comprises a cylindrical rotor having a plurality of cavities bored or otherwise placed on its cylindrical surface. The rotor turns within a closely proximate cylindrical housing, permitting a specified, relatively small, space or gap between the rotor and the housing. Fluid usually enters at the face or end of the rotor, flows toward the outer surface, and enters the space between the concentric cylindrical surfaces of the rotor and the housing. While the rotor is turning, the fluid continues to flow within its confined space toward the exit at the other side of the rotor, but it encounters the cavities as it goes. Flowing fluid tends to fill the cavities, but is immediately expelled from them by the centrifugal force of the spinning rotor. This creates a small volume of very low pressure within the cavities, again drawing the fluid into them, to implode or cavitate. This controlled, semi-violent action of micro cavitation brings about a desired conversion of kinetic and mechanical energy to thermal energy, elevating the temperature of the fluid without the use of a conventional heat transfer surface.

I refer to the cavitation device I use as a cavitation mixer because it is sometimes, in my invention, used as a shearing device instead of heating by cavitation, as will be explained below. The loop in which the cavitation mixer is placed will also be described and explained below.

The ingredients for a drilling mud are placed in a mud tank or other container and may be roughly mixed together in any conventional manner. As they are withdrawn to be sent down the well, they encounter a cavitation mixer, preferably a flow-controlled cavitation mixer, referred to herein as a FCCM. The preferred FCCM is a TrueMud™ mixer. The FCCM has variable mixing rates based on the speed of the disc (rotor) and the rate that fluid is pumped through the device, is able to take in additives at controlled rates or dosages, assures a uniform and turbulent entry, preheats the fluid before beginning the cavitation process, and includes means for setting the gap in the entryway as a function of the viscosity of the fluid. The drilling mud passes continuously through the FCCM to the well, where it is destined for the drilling bit. On its way to the well, a rheology meter or viscosity meter reads its rheology or viscosity directly in the conduit, or from samples taken from it, or on a bypass line.

A cavitation device comprises a cavitation rotor within a housing. The cylindrical surface of cavitation rotor has a large number of cavities in it. Its housing has a cylindrical internal surface substantially concentric with the cavitation rotor. The cavitation rotor is mounted on a shaft turned by a motor. Fluid entering through an inlet spreads to the space between the cavities and the conforming cylindrical internal surface of the housing and is subjected to cavitation—that is, it tends to fall into the cavities but is immediately ejected from them by centrifugal force, which causes a partial vacuum in the cavities; the vacuum is immediately filled, accompanied by the generation of heat and violent motion in and around the cavities. This highly turbulent action in the cavitation zone between the two cylindrical surfaces of the cavitation device thoroughly mixes and heats the materials before the mixture passes through an outlet. While any cavitation device as just described may perform satisfactorily in my invention, I prefer to use a "flow-controlled" cavitation device, which has a generally conical surface positioned centrally on the rotor to face the incoming fluid and to assist the flow of the fluid to the perimeter of the rotor.

The rheology or viscosity meter combined with the FCCM mixer eliminates the need for routine mud checks by continuously reporting rheology using a process control loop. Mud checks primarily report rheology by measuring shear rate and shear stress at predetermined temperatures. In the prior art, typically a sample of the fluid is heated to 100° F. where viscosity measurements are taken with a Fann 35 or equivalent rotor and bob viscometer and then the measurements are repeated at 150° F. This is a time-consuming procedure which delays reports, often resulting in their misapplication. The TrueMud™ mixer used in the present invention is a heating device that not only shears the mud, but heats it by converting shaft horsepower into heat. By adding temperature controls to the device, the heat can be adjusted with the speed (RPM, or angular velocity) of the disk and the flow through the device. By adding a pump and a bypass line, a process control loop with a known volume can be circulated in the present invention to shear the mud at a given flow rate and to heat the mud to report accurate, temperature dependent rheology of the fluid actually headed to the well.

There are several devices that can measure viscosity of drilling mud including, but not limited to a Brookfield TT-100 that measures viscosity at different reciprocal seconds of shear to provide real time rheology. Other devices such as an Endress+Hauser Promass 83i measures viscosity based on vibration feedback correlated to different reciprocal seconds. Since drilling muds contain solids, a pipe rheometer also works well, also enabling the calculation of a friction factor at different flow rates. A pipe rheometer calculates rheology based on flow rate and pressure drop across a known length of pipe. Once steady-state is reached in the process control loop, fluid can be added and removed from the same loop by controlling the valves that allow fluid into and out of the process control loop. The flow into and out of the loop can be automatically adjusted by simple temperature, desired process flowrate or by viscosity/rheology measurement. Using all digital sensors, the process control loop can be automated by a process logic controller, and/or a computer and then easily reported remotely using the Internet. Such a device including the process control loop is scalable. A 1 inch device may be used simply as a method to do automated mud checks or as a laboratory device, whereas a 2 inch or 3 inch device can fully process the fluid being used at the well.

The combined shearing device and rheology process control loop acts on a realtime aliquot of the drilling fluid in the well or in a tank. The realtime aliquot solves the problem of sampling in a stratified tank, or running mud checks in a dynamic system where the mud is changing for any number of reasons including water influx. The known volume of fluid in the loop is actually used in the well, unlike a sample tested in a laboratory. The aliquot may be isolated and the method of the invention performed while drilling is stopped (for example when a pipe is added to the drill string) and the mud is not flowing to the well, or while drilling is progressing.

The process control loop can contain (contains) mixing equipment such that the realtime aliquot of the larger volume of drilling mud can be adjusted and rheology, density, pH, electrical stability, and other properties measured immediately to check potential mud treatments before mixing the full volume of drilling fluid. In the laboratory such adjustments are done on a "barrel equivalent" of mud which consists of 350 ml of fluid and 1 gram equals 1 pound per barrel. In the field you have to adjust the full mud volume and wait to run mud checks after the mud has circulated through the drill bit. That process often takes more than one circulation and more than one mud check to get the desired mud properties. There is a known volume of mud in the process control loop of the present invention and a known flow rate. Small volumes of chemistry can be mixed into the mud either by isolating the process control loop or by proportioning the chemical concentration based on flow in the process control loop to immediately know the mud properties before adding the chemistry (chemicals) to the full volume of mud.

Furthermore, the meter can send readings continuously or intermittently to a controller which controls the addition of mud thinner, polymers to add viscosity, and other additives. The controller also controls the speed of the mixer and/or flow through the mixer. The thus prepared drilling mud proceeds to the drill bit where it already has the desired attributes.

In the vicinity of the drill bit, the drilling mud picks up drill cuttings and other solids; the drilling mud is designed to do so efficiently and carry the solids back to the surface where the bulk cuttings are removed with surface separation equipment such as hydrocyclones, screens and centrifuges. The separation process is designed to be efficient, but some of the mud is lost in this process and low gravity solids below 10 micron in size are generally not removed. New mud is mixed in a mud tank where the used mud including low gravity solids that could not be removed is mixed with new drilling mud ingredients, thus changing the properties of the material in the tank. The invention continues to adjust the properties of the drilling mud by monitoring and maintaining viscosity or rheology by regulating the energy input to the FCCD and the amount of additives replenished or added to the drilling mud. Furthermore information generated in the present invention can be used to remotely monitor the drilling mud such that a skilled mud engineer is not required to do continual mud checks at the rig site and can therefore manage more rigs.

The TrueMud™ (FCCD) mixer configuration allows for viscosity measurements since it is essentially a Couette style device with a rotor. The calculations are widely reported in the literature and can be found on Page 21 of "More Solutions to Sticky Problems" published by Brookfield Engineering Labs, Inc.

The FCCD is a spinning disk inside of a cylinder and can be set up to measure rheology. Rheology is shear stress measured at different shear rates. Shear rate is represented by the speed of the spinning disk. Shear stress is the torque required to spin the disk. Both can be accurately measured and the calculations are known to convert the speed of the disk and torque into a viscosity. There are some unknowns such as critical velocity. To measure rheology, the fluid should be in laminar flow below the critical velocity. To overcome any unknowns, the FCCD can be calibrated either by using a calibration fluid such as 100 centistoke silicone oil that is also used to calibrate laboratory rheometers, or the viscosity can be normalized to one known viscosity point using pressure drop across a known length of pipe or a device that measures viscosity at one shear rate. Furthermore, the viscosity can be compared to a manual Fann 35 reading done in the field and in all cases software can be used to adjust the viscosity to match the Fann 35 viscosity.

DETAILED DESCRIPTION OF THE INVENTION

Figure 1:
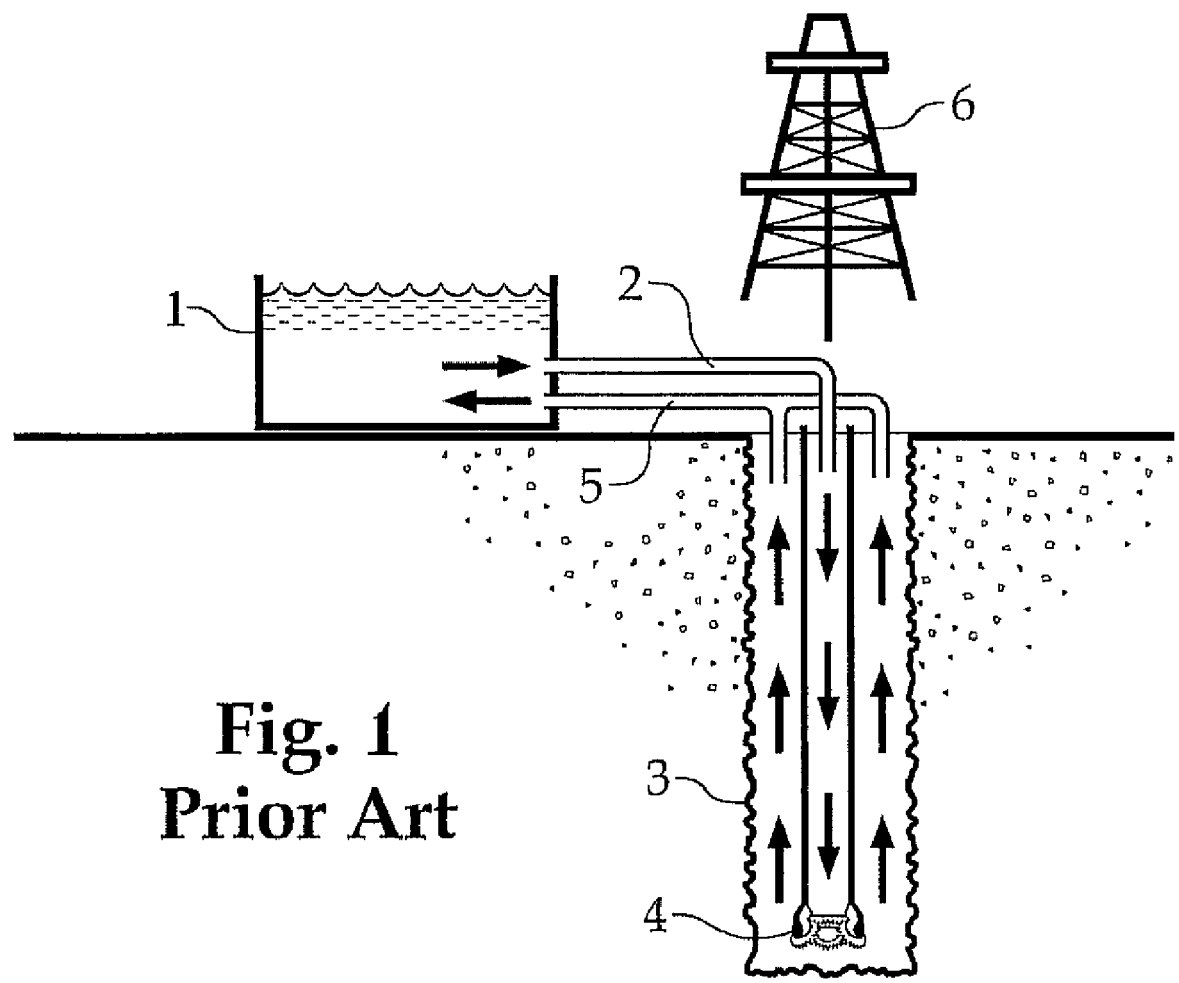
FIG. 1 is a diagram of the prior art method using the drill bit to shear the fluid.

FIG. 1 illustrates diagrammatically the prior art method of relying on the drill bit to shear mix the mud ingredients. The parts are not shown in relative proportion. Mud tank 1 contains the ingredients for a drilling mud. It may have a rough mixing capability, not shown. As drilling commences and proceeds, the mud in tank 1 is sent in conduit 2 to the well 3 below rig 6, following the path indicated by the downwardly oriented arrows to the bottom of the well 3 and the drill bit 4. The fluid may be directed through nozzles or ports on the drill bit, causing shearing. As the drill bit 4 does its work, drill cuttings are created, and these are picked up by the drilling mud and removed as indicated by the upwardly oriented arrows. From the top of the well 3, the solids-laden used drilling fluid is returned through conduit 5 to the tank 1 where it mingles with the mud ingredients already there. The effects of shearing through or around the drill bit are difficult to relate to the properties of the fluid in the tank. Moreover, the fluid is not sheared prior to entering the well, as is desirable. In addition, the prior art method, and modifications of it, rely on time-consuming and error-prone sampling and laboratory tests.

Figure 2:
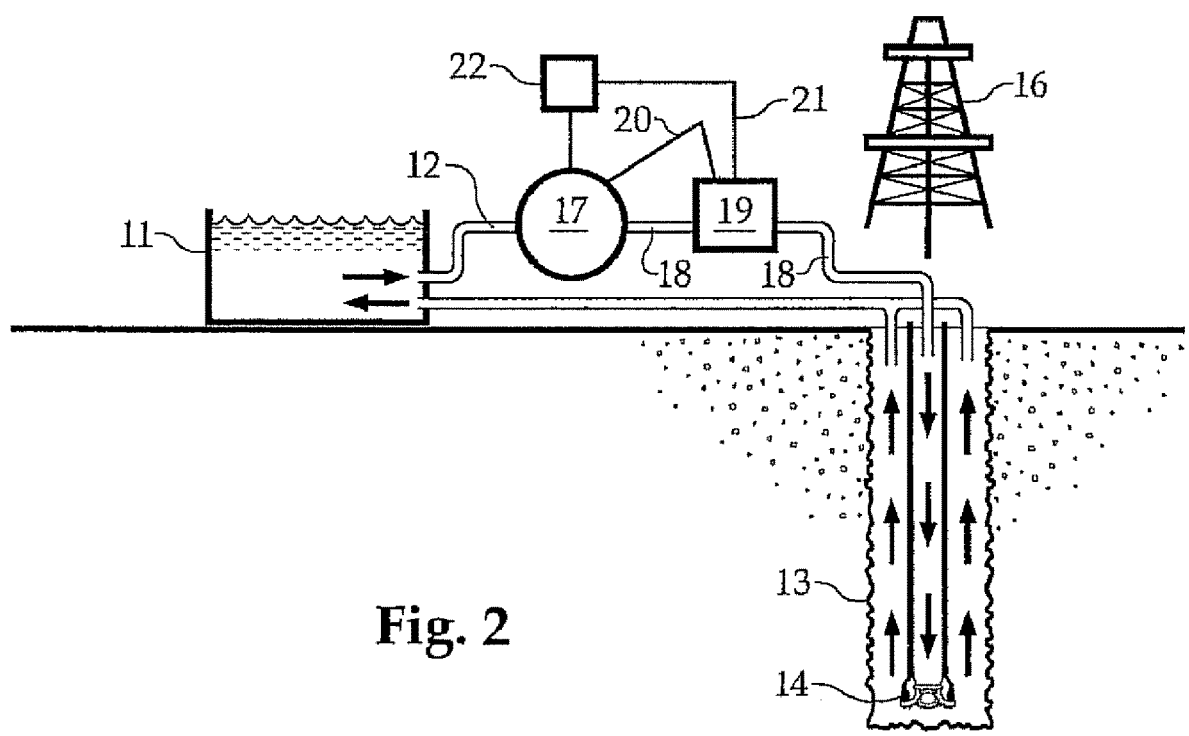
FIG. 2 is a diagram of the invention method.

Referring to the simplified diagram of the invention in FIG. 2, mud tank 11 contains the ingredients for a drilling mud. It normally will have a rough mixing capability, not shown. As drilling commences and proceeds, the mud in tank 11 is sent in conduit 12 to the flow-controlled cavitation mixer 17, where it is shear mixed, and then through conduit 18 to viscometer 19, which measures its viscosity. It then continues in conduit 18 to well 13 associated with rig 16, following the path indicated by the downwardly oriented arrows to the bottom of the well 13 and the drill bit 14. As the drill bit 14 does its work, drill cuttings are created, and these are picked up by the drilling mud and removed as indicated by the upwardly oriented arrows. From the top of the well 13, the solids-laden used drilling fluid is returned to the tank 11 where it mingles with the mud ingredients already there.

Viscometer 19 generates a signal sent through line 20 which is used to control the speed or energy input of flow-controlled cavitation mixer 17 as a function of viscosity. Viscometer 19 also generates a signal sent through line 21 which is used to control the introduction of viscosity-modifying agent from source 22. A process controller, not shown, can manage the viscosity inputs and regulate the mixer and the viscosity-modifying agents according to programmed instructions.

It is thus not necessary to rely on the drill bit to perform the highly desirable function of shear mixing. And, the drilling mud is at all times at the desired viscosity. The shear mixing action of the cavitation mixer 17 will be further explained with respect to FIG. 3.

Figure 3:
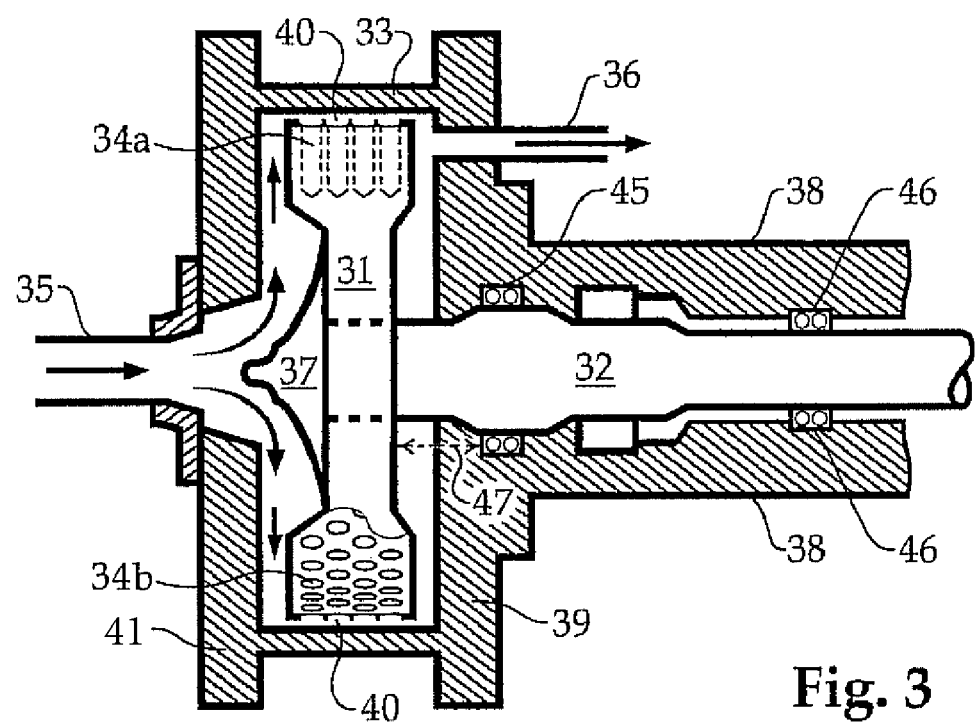
FIG. 3 is a partly sectional view of the flow controlled cavitation mixer.

FIG. 3 is a partly sectional view of a flow-controlled cavitation mixer, or FCCM. The FCCM comprises a substantially cylindrical rotor 31 within a housing having an inlet end 41, an outlet end 39, and encasement 33 defining a cylindrical internal surface substantially concentric with that of rotor 31. Rotor 31 is mounted on shaft 32 which is turned by a motor not shown. Shaft 32 is set on bearings 45 and 46 in extension 38, and its position may be adjusted horizontally (as depicted) to vary the spaces between rotor 31 and housing ends 41 and 39 as indicated by arrow 47. Rotor 31 has cavities around its cylindrical surface; the cavities are illustrated as sections 34a and as openings 34b. Rotor 31 also has a flow director 37 on its inlet side. While rotor 31 rotates, fluid from a source not shown enters through inlet 35 and encounters flow director 37 which spreads it to the periphery of rotor 31 as indicated by the arrows. The fluid then passes through cavitation zone 40, a restricted space where cavitation is induced if the rotor is rotating fast enough, as explained elsewhere herein. Cavitation can be controlled to increase the temperature of the fluid to a desired value by controlling the speed of rotation of the rotor. Conversely, energy input to the FCCM can be controlled by direct measurement of rotation speed, a very useful datum to have for fluids of varying viscosity and rheology such as drilling mud.

The versatile FCCM is also able to act as a viscometer because, when it is not causing cavitation, it acts as a cylindrical spindle, a known form of viscometer employing Couette principles. For the fluid materials relevant to the invention, viscosity may be expressed as the ratio of shear stress to shear rate, or $\mu = I$ where the shear stress T is $T = T/2\pi R_s 2L$ and shear $2wRc2Rs2$ that is $2wRc^2Rs^2/x^2 (Rc^2 - Rs^2)$, where Rc is the radius of the cylinder, in this case the internal width of inlet and outlet ends 41 and 39, $R_s$ is the radius of the spindle, in this case the radius of rotor 31, T is the torque of the rotor acting on the fluid, ω is the angular velocity of the rotor, and x is the radial location at which shear is being calculated. As indicated above, this formula assumes there is no cavitation taking place around the rotor—that is, that the action of the cavitation mixer is limited to generating the shearing action that enables reading shear stress and shear rate without the disruption that would be caused by cavitation. I call this the "shear mode," and when the cavitation mixer is causing cavitation, I call it the "cavitation mode." The above described method of calculating viscosity, and similar formulas in the literature using a spindle and cylinder, I call the "spindle viscosity formula" or, sometimes, "Couette principles."

Persons skilled in the art may observe that most presentations of Couette principles or the cylindrical spindle measurement of viscosity illustrate a spindle that is longer than the diameter of the cylinder in which it resides, and that the cavitation mixer of the present invention is illustrated as the opposite—that is, the length of the "spindle" is the width of rotor 31, which is depicted as shorter than its diameter, or even its radius. This relationship of the cylinder and the housing within which it resides does not fundamentally change the calculation of I to obtain the viscosity However, some reports on the spindle viscosity formula are concerned with the effects of the space at the end of the spindle, and various workers have calculated additional formulas for them. In the present invention, not only are relatively large surfaces present on both "ends" of the rotor 31, but also, the fluid continually flows through the cavitation mixer while the calculations are made. Although the non-cylindrical faces of rotor 31 (the "ends" of the "spindle") are relatively large compared to the width of the rotor, their effects on the calculation of viscosity are reduced by two features of the FCCM construction: first, flow director 37 spreads the incoming mud evenly over its surface so that when the mud enters cavitation zone 40 it will follow a helical path in substantially laminar flow over the cylindrical surface of rotor 31. In the non-cavitation mode—that is, when the rotor 31 is not rotating fast enough to cause cavitation, the cavities 34a and 34b are nevertheless filled with fluid which tends to remain in the cavities, providing surfaces over which the fluid passes. As indicated in FIG. 3, the profile of flow director 37 is a smooth curve tending to reduce turbulence and encourage laminar flow. The smooth curve profile of flow director 37 may be parabolic, elliptical, hyperbolic or a more complex smooth curve, generally campanulate and asymptotic toward the neck of rotor 31. Second, helical flow through cavitation zone 40, even in the absence of cavitation, is somewhat assisted by the position of outlet 36 near the periphery of rotor 31, as the mud passes quickly to outlet 36 from cavitation zone 40 without establishing a significant flow pattern on the outlet side of rotor 31.

Viscosity of slurries has been successfully measured in a helical flow instrument. See, for example, T. J. Akroyd and Q. D. Nguyen, *Continuous Rheometry for Industrial Slurries*, 14th Australasian Fluid Mechanics Conference, 10-14 Dec. 2001. The authors recognized a tangential component to the shear stress as well as an axial component, incorporated into their calculations. See also Shackelford U.S. Pat. No. 5,209,108. Because laminar flow is encouraged across the cavitation zone when measuring viscosity, pressure drop across the cavitation mixer may be used, according to the classical Poiseuille formula explained below, to modify the calculation of viscosity.

Figure 4:
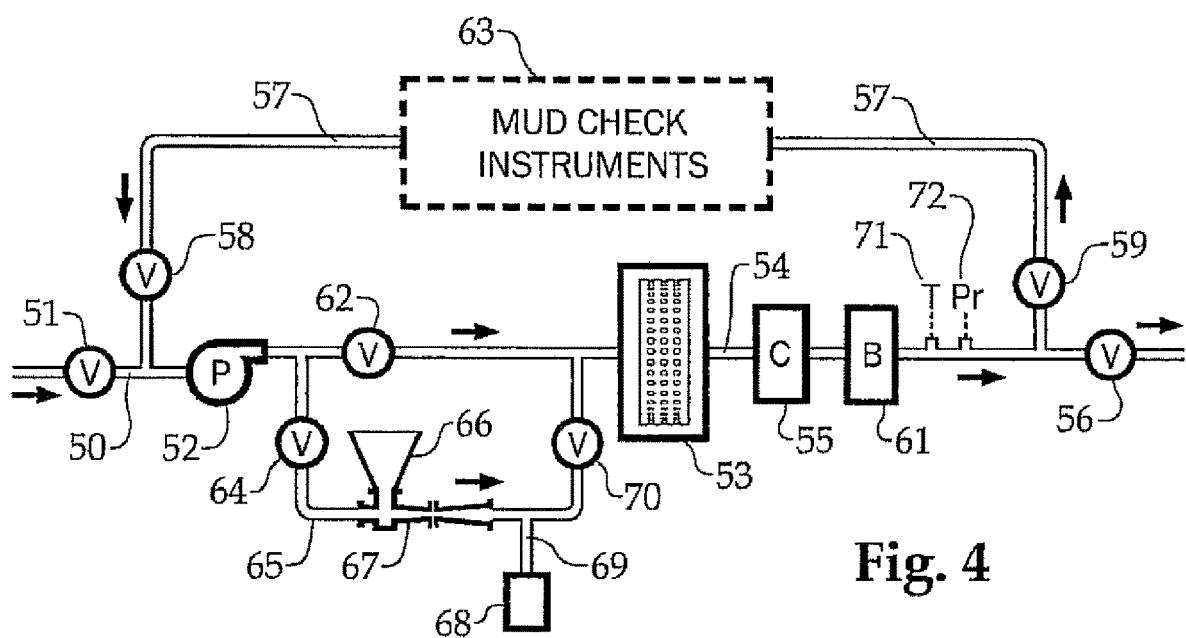
FIG. 4 shows a basic process loop including a cavitation mixer.

In FIG. 4, a flow diagram is presented for a loop of the invention. In this configuration, the cavitation mixer 53 performs two separate functions. In one function, it is operated with power input sufficient to cause cavitation in the fluid until a desired temperature is attained in the fluid. In the cavitation mixer's second function, the power input is reduced so that no cavitation takes place and the cavitation mixer acts as a viscometer.

In the optional "straight-through" mode, which does not employ the recycle loop, the drilling mud ingredients pass through valve 51 on conduit 50 to pump 52, through valve 62, and then into cavitation mixer 53, where they are heated and mixed, then through conduit 54 to Coriolis meter 55 and viscosity meter 61 before passing through valve 56 to a well, or to storage or other use not shown. Coriolis meter 55 (which may be an E+H Coriolis meter) may measure density in conduit 54. Viscosity meter 61, which may be a Brookfield TT-100 viscometer, may be programmed to continually read viscosity at all Fann 35 speeds.

But an important feature of the invention is that an aliquot of fluid (drilling mud) can be isolated in the loop defined by closing valves 51 and 56 and opening valves 58 and 59, thus flowing an isolated, known quantity of fluid continuously in the loop through cavitation mixer 53, conduit 54, conduit 57 and again through conduit 54 to cavitation mixer 53. This may be referred to as the "loop mode." In accordance with the invention, the cavitation mixer is operated in the cavitation mode to quickly heat the mud aliquot to a desired temperature (measured by a transducer or other device not shown), and then it is operated in the non-cavitation, or shear, mode so it can shear the aliquot and be utilized as a viscometer. Acting on the same aliquot of drilling mud as it circulates in the loop, the cavitation mixer 53 may be programmed to heat the mud, by cavitation, to a second temperature and then, without cavitation, to shear it. While shearing the mud, the cavitation mixer may be utilized as a viscometer employing Couette principles. The isolated aliquot may be further heated to a third temperature and viscosity measurements obtained as described elsewhere herein, as a function of torque on the mixer's shaft and angular velocity of the rotor.

When viscosity-modifying agents or other chemicals are to be added to the mud, valve 62 may be closed and valves 64 and 70 opened, causing mud to flow through additive conduit 65. Additive conduit 65 passes through an eductor 67 which assists the feeding of dry chemical (such as dry polymer) from hopper 66 if such a feed is required by the controller. Conduit 65 also is associated with liquid feeder 68, which can, on command, deliver doses of liquid chemical (such as dissolved polymer) into additive conduit 65 through inlet 69. Additives introduced to the mud in additive conduit 65 will be thoroughly mixed into the mud when it passes into cavitation mixer 53.

Persons skilled in the art may recognize that additive conduit 65 is not essential for liquid feeder 68, which could be placed on conduit 50 anywhere upstream of cavitation mixer 53. Eductor 67 for solid additives, however, is an in-line device and accordingly is best used in a separate conduit such as additive conduit 65.

A dashed-line rectangle bearing the reference number 63 on conduit 57 in FIG. 4 is labeled "Mud Check Instruments." This represents any or all of meters, probes, instruments and transducers for detecting or measuring density, flow, viscosity, pH, percent solids, water cut or oil/water ratio, electrical stability, particle size, temperature and other properties of the mud. Such devices are not limited to positioning in or on conduit 57. They may be anywhere in the system; for example, temperature probe 71 and pressure probe 72 are illustrated in conduit 54. Included in Mud Check Instruments 63 are (one or more) computers, processors or controllers necessary or useful to monitor and modify the properties of the mud in the loop. For example, computers, processors, or controllers may be programmed to vary the power input and/or angular velocity of the shaft of cavitation mixer 53, or to open and close valves so that hopper 66 or liquid feeder 68 can deliver prescribed amounts of additives. Data about the mud and the well's operation may be accumulated to provide increasingly accurate refinements to be used possibly in the "straight-through" mode. Additives are proportioned to the aliquot in the loop and circulated to confirm the modifications made to its properties. The "straight-through" mode may be modified to take the illustrated detour through additive conduit 65 for continuous proportionate injections of additive(s).

Viscosity may be measured by a viscometer, not shown, in conduit 54 or conduit 57. Optionally, viscosity may be read by pressure difference as is known in the art. The reduction in pressure between points Pr1 and Pr2 may be ascertained by any acceptable pressure reading devices and the difference used to reinforce the calculations according to the spindle viscosity formula described above and/or viscometer 61. Poiseuille's pressure drop equation for viscosity II. for a fluid flowing in a tube is:

$$\mu = \frac{\pi R^4 gc(P_1 - P_2)C}{8LQ}$$

where R is the radius of the tube, gc is the gravitational constant, Pi is the measured upstream pressure in the tube, P2 is the measured downstream pressure in the tube, C is a constant conversion factor for expressing viscosity in poises, L is the distance on the tube between Pi and P2, and Q is the flow rate of the fluid in the tube. So, where the radius of the tube is fixed and the flow is steady, and because everything else is a constant except the measured pressures, the viscosity II. is directly proportional to the pressure difference.

One of the advantages of my process is that data may quickly be accumulated for more than one temperature for one or more aliquots of the mud. The aliquot isolated in the loop is easily ramped up from, for example, 100° F. to 150° F. to 175° F. In this example, the aliquot is first heated by the cavitation mixer in the cavitation mode to 100° F., the viscosity is measured either by Couette principles applied to the cavitation mixer or by a separate viscometer, or both, then the mud is heated to 150° F. and the viscosity is again measured by one or more devices, and the mud is further heated by the cavitation mixer to, say, 175° F., after which the viscosity is again measured by at least one device, which may be the cavitation mixer itself. Additional temperature levels may be included, or not. As Couette principles require inputs of torque and angular velocity of the rotor 53, these are monitored and sent to the process controller along with the temperature and other properties.

Thus, whether viscosity is measured in the loop at one temperature or at more than one temperature, the viscosity measurements can be stored (along with any other properties found by other instruments) and then used in the straight-through mode to heat the fluid and adjust the viscosity to the desired value until it is determined that additional data are needed. Converting from the loop mode to the straight through mode may be accomplished either by the programmed controller or by a human operator.

I claim:

1. Apparatus for shearing and adjusting properties of drilling mud comprising (a) a drilling mud flow loop including valves capable of isolating an aliquot of said mud in said flow loop, (b) a cavitation mixer in said loop, and (c) a process controller for controlling at least one of angular velocity and power input to said cavitation mixer in response to intermittent or continuous viscosity measurements of said mud, wherein said process controller is programmed to control said cavitation mixer to (a) heat, by cavitation, said drilling mud in said loop to a first predetermined temperature, (b) shear said drilling mud at said first predetermined temperature, without cavitation, (c) further heat, by cavitation, said drilling mud in said loop to a second predetermined temperature, and (d) shear said drilling mud at said second predetermined temperature.

2. Apparatus of claim 1 including a meter in said flow loop for measuring density of said mud in said loop and reporting it to said process controller.

3. Apparatus of claim 1 wherein said process controller is programmed to receive readings of conditions in a well and adjust properties of said mud in said loop as programmed.

4. Apparatus of claim 1 wherein said flow loop is located on a conduit leading from sources of one or more drilling mud ingredients to a well.

5. Apparatus of claim 1 wherein said process controller is programmed to heat, by cavitation, said drilling mud to at least one additional predetermined temperature and to shear, without cavitation, said drilling mud at said at least one additional predetermined temperature.

6. Apparatus of claim 1 wherein said loop includes at least one meter for viscosity, flow, pH, percent solids, water cut or oil/water ratio, electrical stability, particle size, or temperature of said fluid in said loop.

7. Apparatus of claim 1 wherein said process controller is programmed to receive readings of conditions in a well and adjust properties of said mud in said loop as programmed.

* * * * *